(12) United States Patent
Simioni et al.

(10) Patent No.: US 12,250,150 B2
(45) Date of Patent: Mar. 11, 2025

(54) AI-BASED COMPENSATION OF RESOURCE CONSTRAINED COMMUNICATION

(71) Applicant: International Business Machines Corporation, Armonk, NY (US)

(72) Inventors: Marco Simioni, Dublin (IE); Ambrish Rawat, Dublin (IE); Killian Levacher, Dublin (IE); Mark Purcell, Kildare (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 17/563,485

(22) Filed: Dec. 28, 2021

(65) Prior Publication Data

US 2023/0208761 A1    Jun. 29, 2023

(51) Int. Cl.
*G06N 3/04* (2023.01)
*G06N 20/00* (2019.01)
*H04L 47/10* (2022.01)

(52) U.S. Cl.
CPC ............. *H04L 47/10* (2013.01); *G06N 20/00* (2019.01)

(58) Field of Classification Search
None
See application file for complete search history.

(56) References Cited

U.S. PATENT DOCUMENTS

| 7,376,897 B1 | 5/2008 | Mao |
| 8,259,804 B2 | 9/2012 | Lu |
| 8,386,465 B2 | 2/2013 | Ansari et al. |

(Continued)

FOREIGN PATENT DOCUMENTS

| CN | 105393536 B | 3/2016 | |
| DE | 112020004167 T5 * | 7/2022 | ........... G06K 9/6256 |

OTHER PUBLICATIONS

Krishnan et al.; "Artificial Inteligence in Resource-Constrained and Shared Environments", ACM SIGOPS Operating System Review, vol. 53, Issue 1, pp. 1-6, Jul. 2019.

Shao et al.; "Communication-Computation Trade-Off in Resource-Constrained Edge Inference", Cornell University Library, arXiv:2006.02166v2, pp. 1-7, Oct. 14, 2020.

Laborie, Philippe; "Algorithms for Propagating Resource Constraints in AI Planning . . . Results", Artificial Intelligence, vol. 143, Issue 2, pp. 151-188, Feb. 2003.

(Continued)

*Primary Examiner* — Natisha D Cox
(74) *Attorney, Agent, or Firm* — Amin, Turocy & Watson, LLP

(57) ABSTRACT

One or more systems, devices, computer program products and/or computer-implemented methods of use provided herein relate to facilitating a process to compensate a service being provided over a network connection. A system can comprise a memory that stores computer executable components, and a processor that executes the computer executable components stored in the memory, wherein the computer executable components can comprise a determination component that determines a network connection between a server and a client node, and a predictive component that predicts, employing machine learning, a graphical representation update to a service provided by the server over the network connection. The predictive component can generate the prediction in response to a decrease in bandwidth and/or an increase in latency of a network connection. A training component can train a machine learning model employed by the predictive component based on historical data of the service provided by the server.

20 Claims, 10 Drawing Sheets

(56) References Cited

U.S. PATENT DOCUMENTS

| | | | |
|---|---|---|---|
| 10,200,893 B2* | 2/2019 | Tzolov | H04L 41/12 |
| 10,838,839 B2 | 11/2020 | Megahed et al. | |
| 10,839,136 B2 | 11/2020 | Maker et al. | |
| 10,926,177 B2* | 2/2021 | Osman | A63F 13/577 |
| 11,062,483 B1 | 7/2021 | Mavani et al. | |
| 2004/0225744 A1 | 11/2004 | Frossard et al. | |
| 2016/0112732 A1 | 4/2016 | Li et al. | |
| 2017/0054605 A1* | 2/2017 | Duncan | H04L 41/145 |
| 2017/0115488 A1* | 4/2017 | Ambrus | G02B 27/0172 |
| 2019/0198492 A1 | 6/2019 | Liu et al. | |
| 2019/0230167 A1 | 7/2019 | Laari et al. | |
| 2020/0073716 A1 | 3/2020 | Kaul et al. | |
| 2020/0106819 A1* | 4/2020 | Morrison | H04L 65/762 |
| 2020/0306632 A1* | 10/2020 | Kolen | A63F 13/79 |
| 2021/0056378 A1 | 2/2021 | Yang et al. | |
| 2021/0064981 A1 | 3/2021 | Turgeman | |
| 2021/0093960 A1* | 4/2021 | Cerny | H04N 19/142 |
| 2021/0133211 A1 | 5/2021 | Davis et al. | |
| 2021/0146241 A1* | 5/2021 | Bleasdale-Shepherd | H04L 67/131 |
| 2021/0271507 A1 | 9/2021 | Matthew | |
| 2022/0180204 A1* | 6/2022 | Katsuki | G06N 3/045 |
| 2023/0123811 A1* | 4/2023 | Collins | G06N 3/105 706/17 |
| 2023/0161302 A1* | 5/2023 | Gaudry | G06N 5/01 700/44 |

OTHER PUBLICATIONS

Zhang et al.; "Communication-Computation Efficient Device-Edge Co-Inference Via AutoML", Cornell University Library, arXiv:2108.13009v2, pp. 1-6, Aug. 31, 2021.

Gudur et al.; "Resource-Constrained Federated Learning With Heterogenous Labels and Models", Cornell University Library, arXiv:2011.03206v1, pp. 1-6, Nov. 6, 2020.

Wang et al., "ESRGAN: Enhanced Super-Resolution Generative Adversarial Networks" https://arxiv.org/abs/1809.00219 Sep. 1, 2018.

Villagas et al., "Decomposing Motion and Content for Natural Video Sequence Prediction" Jun. 25, 2017 https://arxiv.org/abs/1706.08033.

Pascual et al., "SEGAN: Speech Enhancement Generative Adversarial Network" https://arxiv.org/abs/1703.09452 Mar. 28, 2017.

Tang et al., "XingGAN for Person Image Generation" Jul. 17, 2020. arXiv:2007.09278v1.

Siarohin et al. 2019 "Appearance and Pose-Conditioned Human Image Generation using Deformable GANs" Journal of Latex Class Files, vol. 14, No. 8, Aug. 2015.

Tulyakov et al., "MoCoGAN: Decomposing Motion and Content for Video Generation" arXiv:1707.04993v2 Dec. 14, 2017.

Parsec Protocol https://parsec.app/game-streamingtechnologyb.

Mell et al., "The NIST Definition of Cloud Computing," Recommendations of the National Institute of Standards and Technology, NIST Special Publication 800-145, Sep. 2011, 7 pages.

* cited by examiner

AI-BASED COMPENSATION OF RESOURCE CONSTRAINED COMMUNICATION

BACKGROUND

In the field of artificial intelligent computer systems, machine learning (ML), a subset of artificial intelligence (AI), can employ algorithms to learn from data and create predictions based on this data. AI can learn from a data set to solve problems and to provide relevant recommendations.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. One or more embodiments described herein can be employed to address one or more deficiencies in existing code development techniques. In one or more embodiments described herein, systems, computer-implemented methods, apparatuses and/or computer program products can facilitate a process to compensate a service being provided over a network connection. For example, one or more embodiments described herein can be employed to predict and generate continued service updates to compensate for a resource constrained communication. one or more code attributes and/or code portions for use in a project code to be written.

In accordance with an embodiment, a system can comprise a memory that stores computer executable components, and a processor that executes the computer executable components stored in the memory, wherein the computer executable components can comprise a determination component that determines a network connection between a server and a client node, and a predictive component that predicts, employing machine learning, a graphical representation update to a service provided by the server over the network connection.

In accordance with another embodiment, a computer-implemented method can comprise determining, by a system operatively coupled to a processor, a network connection between a server and a client node, and predicting, by the system, employing machine learning, a graphical representation update to a service provided by the server over the network connection.

In accordance with yet another embodiment, a computer program product, facilitating a process to compensate a service being provided over a network connection, can comprise a computer readable storage medium having program instructions embodied therewith, the program instructions executable by a processor to cause the processor to determine, by the processor, a network connection between a server and a client node and to predict, by the processor, employing machine learning, a graphical representation update to a service provided by the server over the network connection.

An advantage of the aforementioned systems, computer-implemented methods and/or computer program products can be generation of a compensating update for an initial service, whether graphical or otherwise, to compensate for a resource constrained transmission and/or server providing the initial service. The compensating update can account for low bandwidth and/or high latency network connections, such as employing real-time predictions. These one or more embodiments can be provided at a selectively determined instant, such as based on one or more bandwidth and/or latency thresholds. The one or more embodiments additionally and/or alternatively can provide a plug-and-play solution such as be initiating one or more predictions and generating an update where resource constraint is determined, such as via the thresholds.

DETAILED DESCRIPTION

Figure 1:
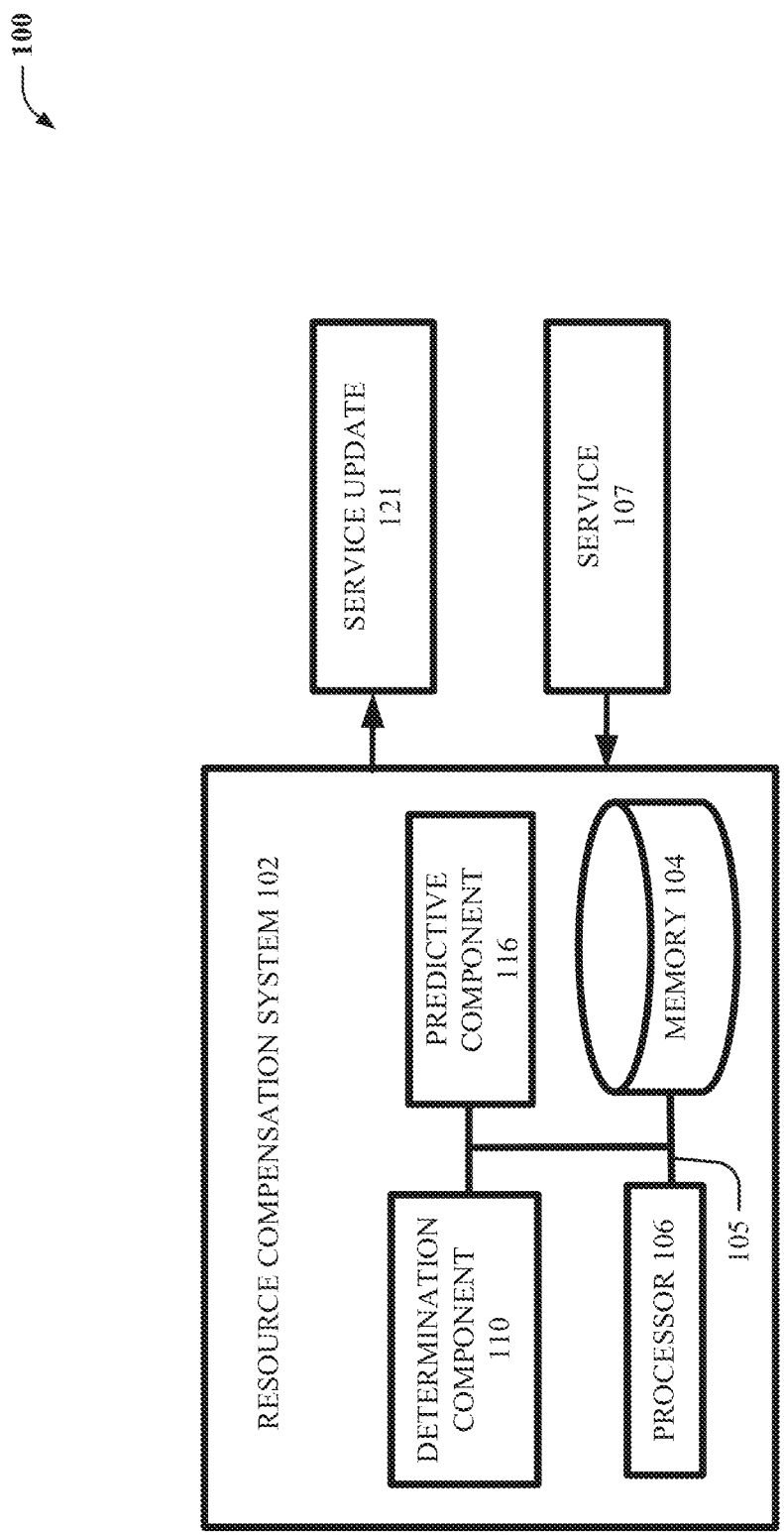
FIG. 1 illustrates a block diagram of an example, non-limiting system that can facilitate a process to compensate a service being provided over a network connection, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Advent of cloud computing technologies, together with increasingly fast internet and/or other network connections, can enable services to be provided to various clients. These services can include business-related, educational-related, entertainment-related and/or other service types. For example, remote gaming can comprise where a gamer can use a minimal client to connect to a virtual machine in a cloud equipped with GPU and hardware. Another example can comprise a remote surgery, where a doctor can perform a surgery on a patient remotely via an internet or other connection. Film and/or television streaming services are yet another example.

To provide such services, the services, and thus the client, can rely on high speeds and low latency of network connection(s). High speed can comprise high download and/or upload bandwidth, such as in the order of tenths/hundredths of megabits per second. For example, communication between a remote service and a client node might admit constrained bandwidth and the client node and/or user can compensate by off-loading computation to a local machine. In another example, if bandwidth of a connection used to stream a film drops from about 100 megabits per second (Mb/s) to about 10 Mb/s, the resulting experience can be disappointing. Low latency can comprise low round trip time between source server and client destination, such as in the order of about milliseconds. That is, degradation, even minimal degradation, of connection speed and/or of connection latency can undermine a user experience and/or ultimately nullify a service provision. For example, communication sent from a remote service to a local client node can incur undesired delays. In another example, if the latency of an internet connection used by a competitive gamer increases above about 20 milliseconds (ms) to about 30 ms, the resulting degradation can be frustrating.

Existing technologies attempting to compensate for such issues can be single-service-related and thus unable to compensate predictively relative to the ever-changing environment(s) of services provided over network connections.

As used herein, the term "client" refers to a node (e.g., client node) that receives and employs a service received over a network connection from a providing server (e.g., server).

Described herein are one or more embodiments of a system, computer-implemented method and/or computer program product that can account for one or more deficiencies of existing technologies, such as by generally providing real-time and/or plug-and-play remote graphical user interface, generative modelling and/or remote desktop. That is the one or more embodiments described herein can compensate for a resource constrained communication, such as compensating for low bandwidth and/or high latency network connection. This can be accomplished by employing an ML or AI model to provide predictions for updating the service being provided to the client, even absent continued package receipt from the server providing the service.

Communication can be coordinated between a remote server and a client node connected to one another by a suitable network connection, such as an internet, local area network and/or wide area network. A predictive component of a system described herein can receive updates from the remote server and input signals from the client node. Based on the updates and input signals received, the system can predict how information on output devise connected to the client node (e.g., screen, graphical user interface and/or the like) are to be updated to best reflect the information having been received from the remote service and/or that should have been continually received from the remote service.

Generally, provided are one or more embodiments of a system, computer-implemented method and/or computer program product that can facilitate a process to compensate degrading communication channels with local computation via artificial intelligence (AI) and/or machine learning (ML). As used herein, the term AI can refer to both AI and ML modelling. Relative to the one or more embodiments described herein, a local AI model can govern latency and/or bandwidth at a client node and/or can revert to the network connection for synchronizing the outputs of the service server and one or more embodiments, on a less than continuous basis.

Fields of use can be broad and are not limited to any one or more examples provided herein.

One or more embodiments are now described with reference to the drawings, where like referenced numerals are used to refer to like elements throughout. As used herein, the terms "entity", "requesting entity", "user entity" and/or "client" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
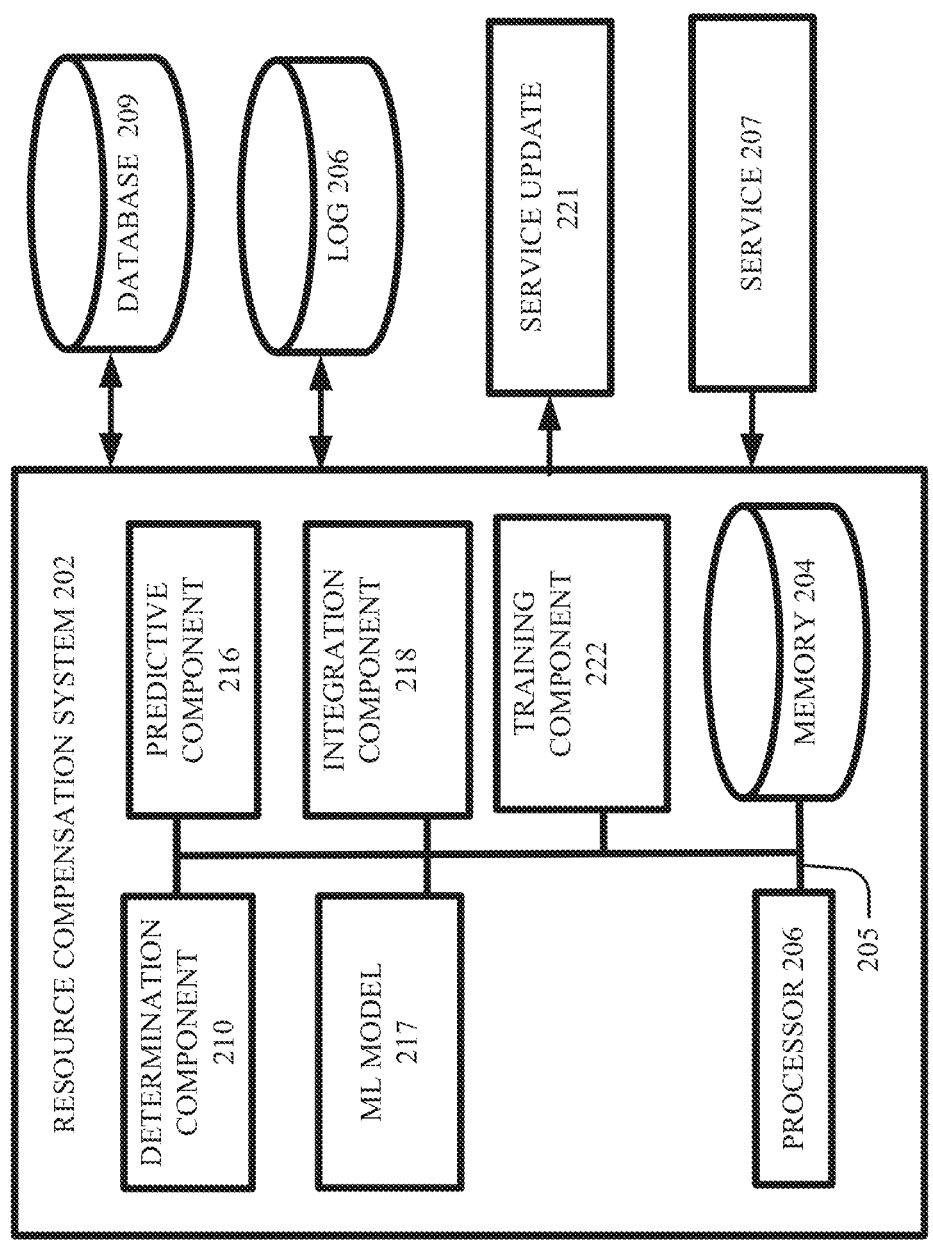
FIG. 2 illustrates a block diagram of another example, non-limiting system that can facilitate a process to compensate a service being provided over a network connection, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can facilitate a process to compensate a service being provided over a network connection. For example, FIG. 1 illustrates a block diagram of an example, non-limiting system 100 that can employ AI and/or ML to facilitate such ends.

At FIG. 1, illustrated is a block diagram of an example, non-limiting system 100 that can facilitate service compensation, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise a resource compensation system 102. Resource compensation system 102 can comprise one or more components, such as a memory 104, processor 106, bus 105, determination component 110 and/or predictive component 116. Generally, resource compensation system 102 can facilitate, in response to a determination of a lagging service connection, one or more service updates 121 to compensate for the service 107 being lagged.

The determination component 110 can generally determine a network connection between a server and a client node. The server can be a remote server, local server and/or the like providing a service 107 to the client node. The client node and/or the server can comprise any suitable components, hardware and/or software for facilitating respective service provision and/or service usage. The network connection can be any suitable wired, wireless, local and/or wide area connection.

The predictive component 116 can, generally, predict, employing machine learning (ML), a service update to the resource-constrained service 107. The service update can be a graphical representation update to the service 107 that is being provided by the server over the network connection. As will be described in greater detail below, such prediction can be facilitated by any one or more of ML, AI and/or AI planning.

One or more aspects of a component (e.g., the determination component 110 and/or the predictive component 116 can be employed separately and/or in combination, such as employing one or more of a memory or a processor of a system that includes the component to thereby facilitate generation and/or prediction of the service update 121. That is, these components can employ the processor 106 and/or the memory 104. Additionally and/or alternatively, the processor 106 can execute one or more program instructions to cause the processor 106 to perform one or more operations by these components.

Turning next to FIG. 2, the figure illustrates a diagram of an example, non-limiting system 200 that can facilitate a process to compensate a service being provided over a network connection, in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a resource compensation system 202. Generally, resource compensation system 202 can facilitate, in response to a degrading service 207 and/or degrading network connection 207, a service update 221 to a client node. General operations that can be executed by the resource compensation system 202 can comprise, but are not limited to, prediction of a service update, reversion to the server providing the service 207 at a selectively determined frequency, generation of a graphical representation based on the service update, training of an AI or ML model, and/or facilitation of a plug-and-play connection between the server and the client node. These general operations can provide one or more of deployment of real time operations in environments where bandwidth and/or network latency requirements are high (e.g., remote surgery), of provision of a real-time experience to a client, and/or of enabling data and/or latency load of a network to be reduced and/or off-loaded with minimal and/or no deleterious effect to the service being provided to the client (e.g., client node).

The resource compensation system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, resource compensation system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the resource compensation system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The resource compensation system 202 can be associated with, such as accessible via, a cloud computing environment. For example, the resource compensation system 202 can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090).

Operation of the non-limiting system 200 and/or of the resource compensation system 202 is not limited to provision of a single service update or to compensation for a single service. Rather, operation of the non-limiting system 200 and/or of the resource compensation system 202 can be scalable. For example, the non-limiting system 200 and/or the resource compensation system 202 can facilitate prediction of one or more service updates for a same service, plural services and/or plural clients, such as at least partially at a same time. Further, the non-limiting system 200 and/or the resource compensation system 202 can train more than one ML model and/or AI model at a time, at a same time as and/or separately from the aforementioned predicting.

The resource compensation system 202 can comprise a plurality of components. The components can include a memory 204, processor 206, bus 205, determination component 210, predictive component 216, ML model 217, integration component 218 and/or training component 222. Like the resource compensation system 102, the resource compensation system 202 can be operated to facilitate compensation for a lagging service 207 and/or network connection.

One or more communications between one or more components of the non-limiting system 200, and/or between an external system, such as comprising and/or facilitating access to any one or more of a database 209, log 206, service 207, and/or the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the resource compensation system 202.

For example, in one or more embodiments, resource compensation system 202 can comprise a processor 206 (e.g., computer processing unit, microprocessor, classical processor, quantum processor and/or like processor). In one or more embodiments, a component associated with resource compensation system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise determination component 210, predictive component 216, ML model 217, integration component 218 and/or training component 222.

In one or more embodiments, the resource compensation system 202 can comprise a computer-readable memory 204 that can be operably connected to the processor 206. The memory 204 can store computer-executable instructions that, upon execution by the processor 206, can cause the processor 206 and/or one or more other components of the resource compensation system 202 (e.g., determination component 210, predictive component 216, ML model 217, integration component 218 and/or training component 222) to perform one or more actions. In one or more embodiments, the memory 204 can store computer-executable components (e.g., determination component 210, predictive component 216, ML model 217, integration component 218 and/or training component 222).

Resource compensation system 202 and/or a component thereof as described herein, can be communicatively, electrically, operatively, optically and/or otherwise coupled to one another via a bus 205 to perform functions of non-limiting system 200, resource compensation system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, resource compensation system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, resource compensation system 202 can comprise one or more computer and/or machine readable, writable and/or executable components and/or instructions that, when executed by processor 206, can facilitate performance of one or more operations defined by such component(s) and/or instruction(s).

Figure 3:
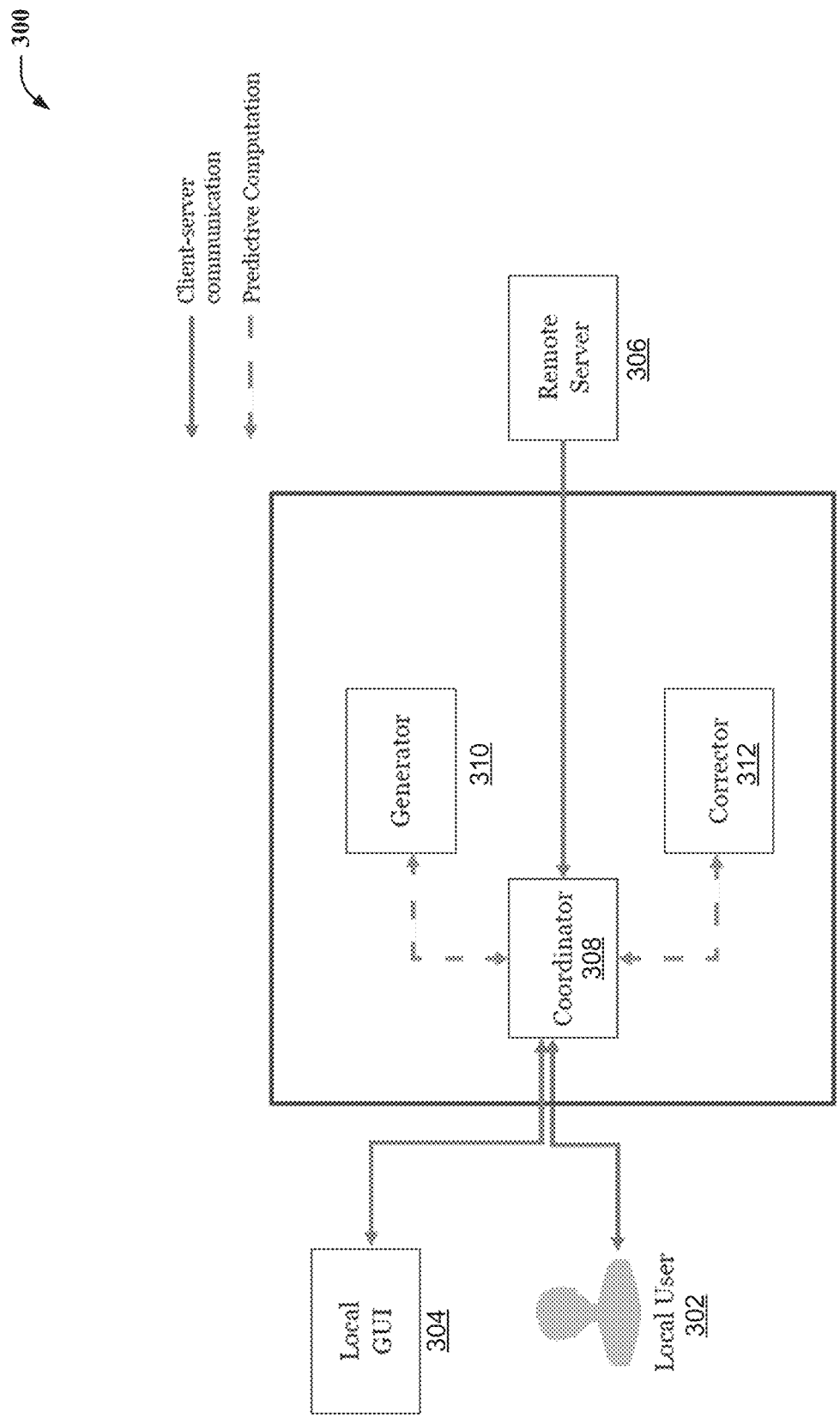
FIG. 3 illustrates a high-level schematic diagram of an example process flow that can facilitate compensating a service being provided over a network connection, in accordance with one or more embodiments described herein.

Turning now briefly to FIG. 3, illustrated is an example schematic 300 of use of the resource compensation system 202. A server (e.g., remote server 306) can provide a service 207 to a local user 302 and/or to a component connected to the client node, such as a local GUI 304. Where resources are constrained, a coordinator 308 (e.g., resource compensation system 202) can employ one or more of a generator 310 (e.g., ML model 217) and/or corrector (e.g., predictive component 216) to continue to supply the service 207, e.g., locally-provided, to the client node.

Turning now again to FIG. 2 and to the determination component 210, the determination component 210 can generally determine a network connection between a server and a client node. The server can be a remote server, local server and/or the like providing a service 207 to the client node. The client node and/or the server can comprise any suitable components, hardware and/or software for facilitating respective service provision and/or service usage. The network connection can be any suitable wired, wireless, local and/or wide area connection.

In one or more embodiments, the integration component 218, in correspondence with the determination component 210, can monitor the bandwidth, latency and/or other parameter of the determined network connection. One or more selectively determined thresholds for bandwidth, latency and/or other parameter can be employed to determine when compensation by the non-limiting system 200 is to be employed. The thresholds can be provided by the system 200 and/or can be selectively entered by an entity, such as a user entity associated with the client node. Where one or more thresholds are crossed, the integration component 218 can initiate usage of the predictive component 216, to thereby provide plug-and-play function to the client node, with the intention of minimally-interrupted or non-interrupted service 207.

The predictive component 216 can, generally, predict, employing artificial intelligence (AI) such as machine learning (ML), a service update to the resource-constrained service 207. The service update can be a graphical representation update to the service 207 that is being provided by the server over the network connection. As will be described in greater detail below, such prediction can be facilitated by any one or more of ML, AI and/or AI planning.

More particularly, the predictive component 216 can employ historical data of the service 207 provided by the servicer, information from the server and/or information from the client node (e.g., an input signal). Historical data can be downloaded, accessed and/or otherwise obtained from any suitable location, such as a database 209 and/or log 206 available to the resource compensation system 202. Using any one or more aspects of this information (e.g., data and/or metadata), the information can be provided to an ML model 217 by the predictive component 216.

The ML model 217 can have been trained, and/or a component (e.g., processor 206) can generated the ML model 217 using the information provided by the predictive component 216. In one or more embodiments, provision of the ML model 217 can comprise training the ML model 217 on one or more, such as a plurality, of services that can be provided to the client. This training can be facilitated by the training component 222. In one or more embodiments, provision of the ML model 217 can comprise training the ML model 217 on one or more software packages, software development packages, code languages and/or the like, such as by the training component 222.

Using the information obtained by the predictive component 216, the ML model 217 can be employed to generate a service update 221. The service update 221 can be a graphical representation, remote desktop representation and/or the like.

Generally, the service update 221 can be intended as a temporary output for which the network connection and/or service 207 can be intended to eventually re-compensate. However, in one or more embodiments, the resultant service update 221 can be provided on a broader and/or more long-term basis. For example, the determination component 210 and/or integration component 218 can continually and/or at any suitable frequency, monitor the network connection being used by the service 207 to determine if resources are less-constrained than when the resource compensation system 202 was initially initiated.

Whether or not resources are determined as less-constrained than an initial baseline, the integration component 218, and/or other component such as the processor 206, can revert back to the service 207, allowing for updating of the service updates 221 by a combination of outputs from the service 207 and resource compensation system 202. In one or more cases, where resources are still constrained, such combination can be facilitated, such as by the predictive component 216. The combination can include a partial representation of the real representation (e.g., of the visual representation of the remote environment determined by the remote aggregator server) and a partial representation of generated representation output by the ML model 217.

The resultant combined representation can thus be an inferred representation being a locally inferred representation based on the resource compensation system 202 and on the remote real representation. Put another way, in one embodiment related to a graphical representation service, such as a film, movie, video and/or game, a higher dimensional output can be provided by the resource compensation system 202 as the inferred representation, based on a lower dimensional input from a resource constrained communication relative to the service 207.

In one or more cases, where resources are no longer constrained, the resource compensation system 202 can de-initiate, allowing for the service 207 to again be provided. That is, the real representation of the visual representation of the remote environment determined by the remote aggregator server can be employed. This is the true state of the remote environment.

Frequency of reversion to the service 207 can be selectively determined by a user at the client node and/or by the resource compensation system 202.

Figure 4:
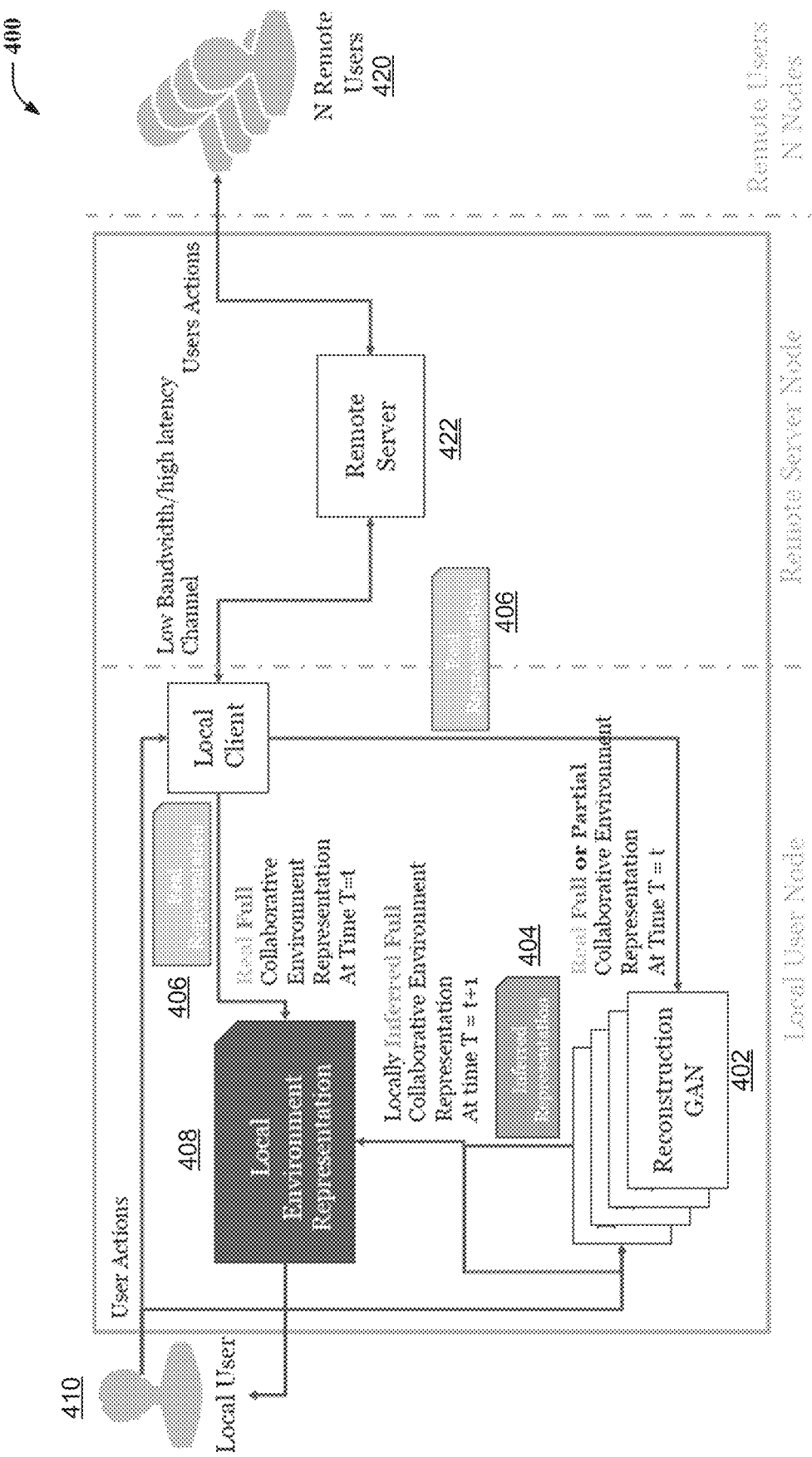
FIG. 4 illustrates a schematic diagram of an example process flow that can facilitate training an AI or ML model to compensate a service being provided over a network connection, in accordance with one or more embodiments described herein.

For example, turning now briefly to FIG. 4, a schematic 400 is illustrated depicting use of the resource compensation system 202. For example, a predictive component (e.g., predictive component 216) can employ a reconstruction GAN 402 to provide an inferred representation 404. The inferred representation 404 and the real representation 406 can both be employed to provide the local environment representation 408 to the user 410, such as described above, depending on the resource-constrained state of the network. As additionally shown, the real representation 406 also can be provided to one or more additional (e.g., N) remote user entities 420 via one or more additional remote servers 422.

Figure 5:
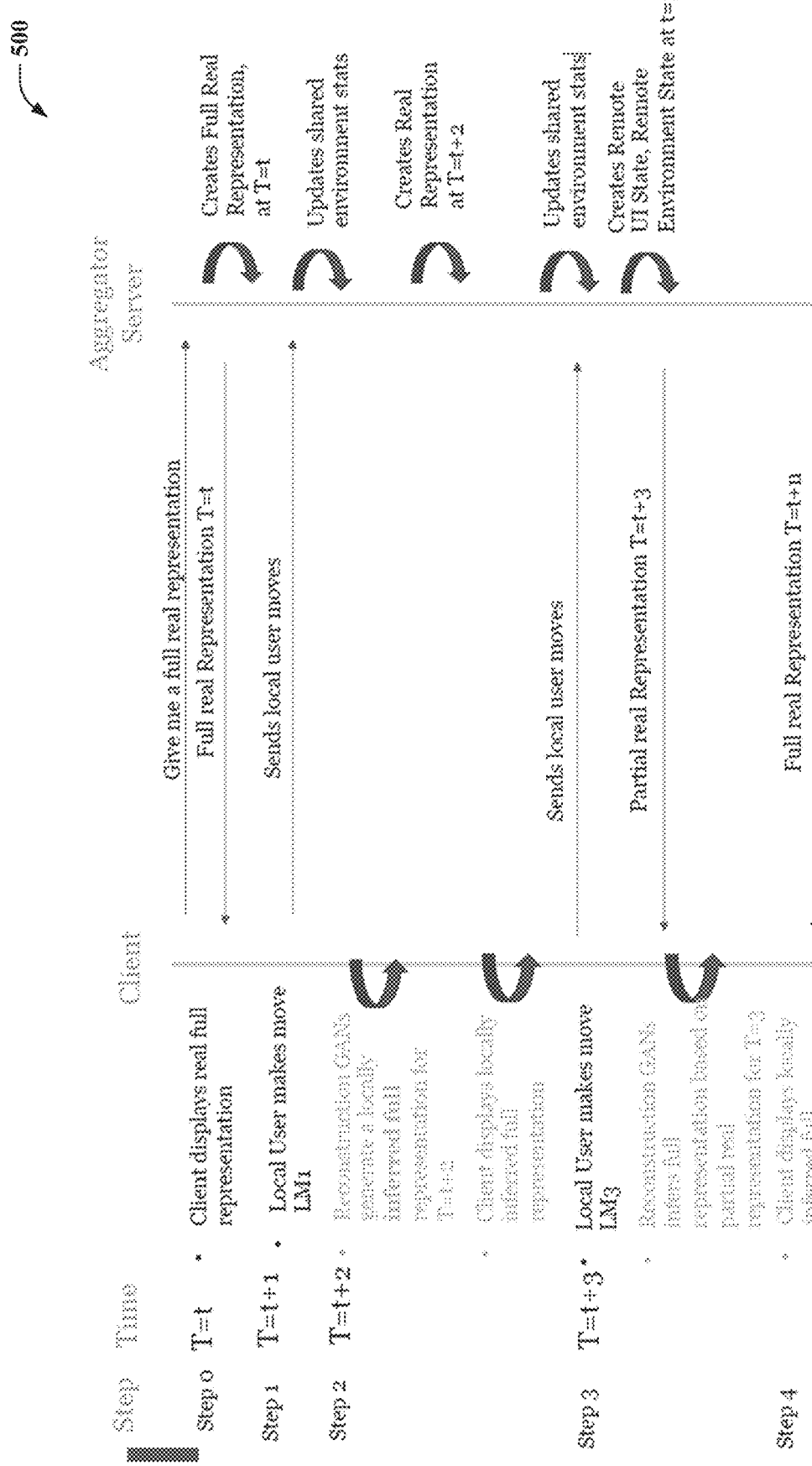
FIG. 5 illustrates a schematic representation of an example process flow scenario for a game being compensated, in accordance with one or more embodiments described herein.

Turning next to FIG. 5, illustrated is a schematic representation of an example process flow scenario 500 for a game being compensated, such as by the resource compensation system 202 and/or non-limiting system 200.

For example, at initial time=t, a client can request a full real representation of a current state of a collaborative environment from a server. At time=t+1, a local user (e.g., entity) can send one or more gaming move decisions to the remote server, such as via the local server. The server can update a status of the collaborative environment based on the moves received. At time=t+2, a predictive component, such as employing one or more GANs and/or ML models, can generate an inferred local representation of the collaborative environment based on the previous real representation and on the determined/sent moves. The local server (e.g., client node) can display to the user entity the locally inferred representation of the environment.

At time=t+3, the local user (e.g., entity) can again send one or more gaming move decisions to the remote server, such as via the local server. Depending on the resource constrained situation of the network and/or remote server, the server can update a status of the collaborative environment based on the moves received and send a real representation to the client node. Alternatively, the client node can continue to employ a predictive component to generate an updated inferred local representation. The inferred local representation can comprise and/or be generated based upon at least an initial partial real representation having been received from the remote server. As a result, the local server (e.g., client node) can again display to the user entity the locally inferred representation of the environment.

One or more steps operated at times=t+2 and t+3 can be repeated in a loop based on one or more reversion decisions by the integration component 218, processor 206 and/or resource compensation system 202.

At time=t+4, the client node can request the remote server to provide a full real representation of the current state of the collaborative environment. The client node, such as via a respective predictive component, can calculate an error estimate between the locally inferred full representation and the real full representation received from the remote server. As a result, the client node can display a representation continuously to the user entity, such as still being a combination-based locally inferred representation of the environment. The combination can comprise a corrected full or partial real representation having been received from the remote server.

Figure 6:
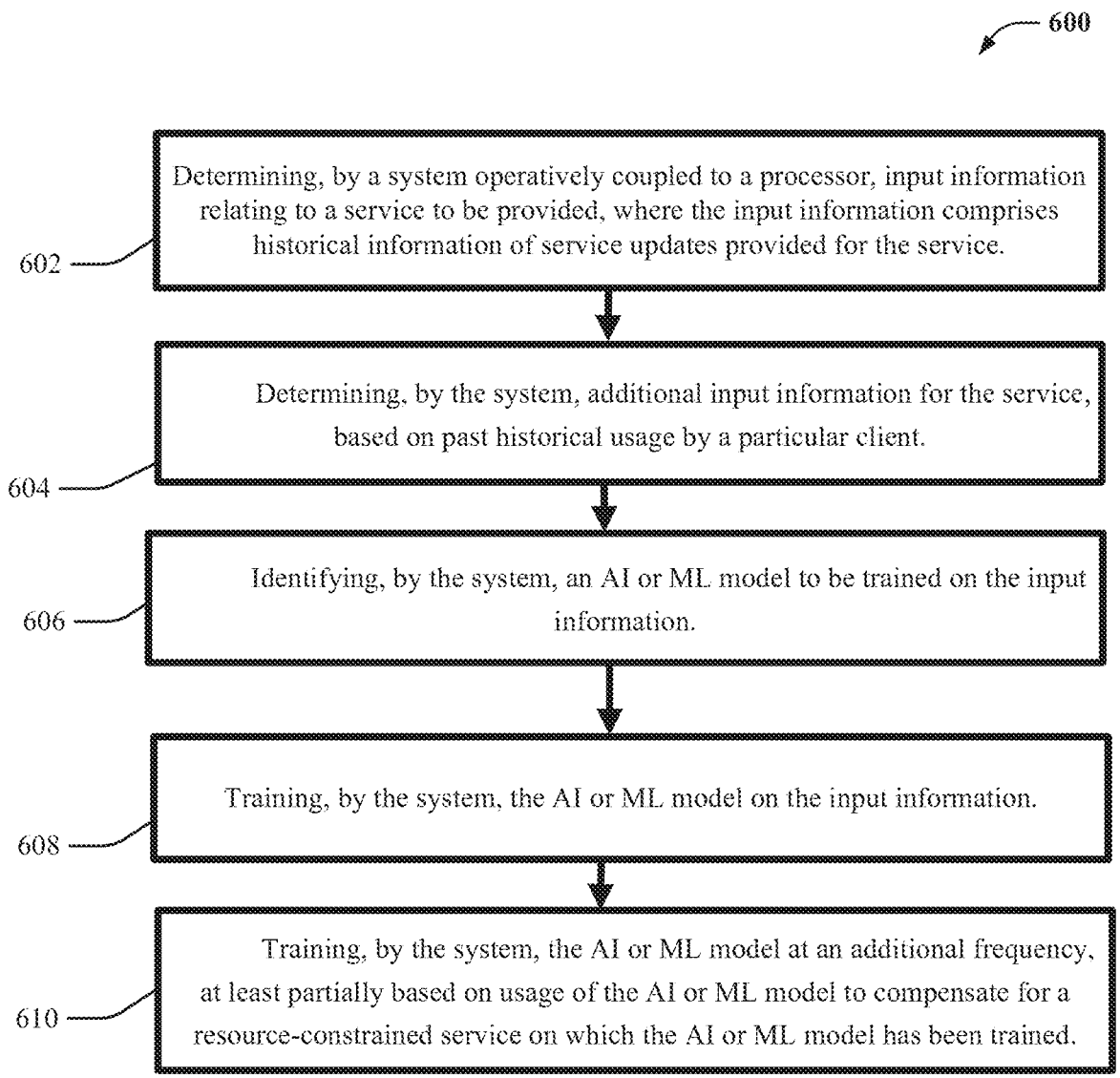
FIG. 6 illustrates a process flow for facilitating a process to compensate a service being provided over a network connection, in accordance with one or more embodiments described herein.

Next, FIG. 6 illustrates a flow diagram of an example, non-limiting method 600 that can facilitate training of an AI or ML model for use in compensating for a resource constrained service, in accordance with one or more embodiments described herein, such as the non-limiting 200 of FIG. 2. While the non-limiting method 600 is described relative to the non-limiting system 200 of FIG. 2, the non-limiting method 600 can be applicable also to other systems described herein, such as the non-limiting system 100 of FIG. 1. Repetitive description of like elements and/or processes employed in respective embodiments is omitted for sake of brevity.

At 602, the non-limiting method 600 can comprise determining, by a system operatively coupled to a processor, input information relating to a service to be provided. The input information can comprise and/or be related to historical information of service updates provided for the service.

At 604, the non-limiting method 600 can comprise determining, by the system, additional input information for the service, based on past historical usage by a particular client.

At 606, the non-limiting method 600 can comprise identifying, by the system, an AI or ML model to be trained on the input information.

At 608, the non-limiting method 600 can comprise training, by the system, the AI or ML model on the input information.

At 610, the non-limiting method 600 can comprise training, by the system, the AI or ML model at an additional frequency, at least partially based on use of the AI or ML model to compensate for a resource-constrained service on which the AI or ML model has been trained.

Figure 7:
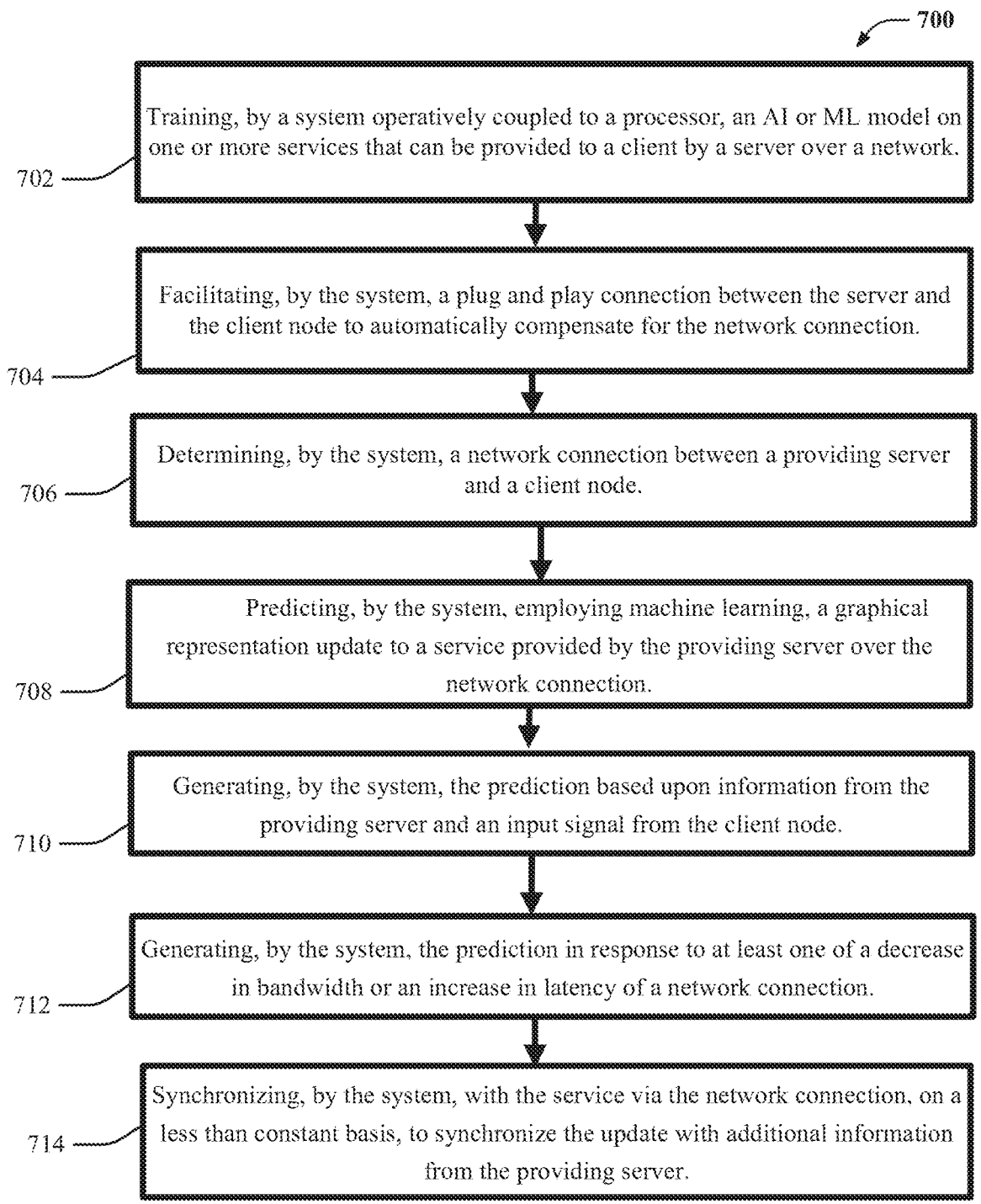
FIG. 7 illustrates another process flow for facilitating a process to compensate a service being provided over a network connection, in accordance with one or more embodiments described herein.

Next, FIG. 7 illustrates a flow diagram of an example, non-limiting method 700 that can facilitate a process to compensate a service being provided over a network connection, in accordance with one or more embodiments described herein, such as the non-limiting 200 of FIG. 2. While the non-limiting method 700 is described relative to the non-limiting system 200 of FIG. 2, the non-limiting method 700 can be applicable also to other systems described herein, such as the non-limiting system 100 of FIG. 1. Repetitive description of like elements and/or processes employed in respective embodiments is omitted for sake of brevity.

At 702, the non-limiting method 700 can comprise training, by a system operatively coupled to a processor, an AI or ML model on one or more services that can be provided to a client by a server over a network. The training can comprise training on historical usage information of the service, including on one or more logs of historically provided updates for the service.

At 704, the non-limiting method 700 can comprise facilitating, by the system, a plug and play connection between the server and the client node to automatically compensate for the network connection.

At 706, the non-limiting method 700 can comprise determining, by the system, a network connection between a providing server and a client node.

At 708, the non-limiting method 700 can comprise predicting, by the system, employing machine learning, a graphical representation update to a service provided by the providing server over the network connection.

At 710, the non-limiting method 700 can comprise generating, by the system, the prediction based upon information from the providing server and an input signal from the client node.

At 712, the non-limiting method 700 can comprise generating, by the system, the prediction in response to at least one of a decrease in bandwidth or an increase in latency of a network connection.

At 714, the non-limiting method 700 can comprise synchronizing, by the system, with the service via the network connection, on a less than constant basis, to synchronize the update with additional information from the providing server.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to facilitating a process to compensate a service being provided over a network connection. A system can comprise a memory that stores computer executable components, and a processor that executes the computer executable components stored in the memory, wherein the computer executable components can comprise a determination component that determines a network connection between a server and a client node, and a predictive component that predicts, employing machine learning, a graphical representation update to a service provided by the server over the network connection. The predictive component can generate the prediction in response to a decrease in bandwidth and/or an increase in latency of a network connection. A training component can train a machine learning model employed by the predictive component based on historical data of the service provided by the server.

An advantage of the aforementioned systems, computer-implemented methods and/or computer program products can be generation of a compensating update for an initial service, whether graphical or otherwise, to compensate for a resource constrained transmission and/or server providing the initial service. The compensating update can account for low bandwidth and/or high latency network connections, such as employing real-time predictions.

In one or more embodiments, a client can be a graphical client and/or the service being provided can include graphical content. As such, the update can provide a partial and/or fully accurate representation of a graphical update that has not been obtained or fully obtained by the client from a service server over a network. Employing an AI model trained on the service, on historical service provisions, recently provided graphical data and/or on one or more generative adversarial networks (GANs), the one or more embodiments described herein can account for a resource constrained communication by continuing to provide updated graphical representations to a client.

These one or more embodiments can be provided at a selectively determined instant, such as based on one or more bandwidth and/or latency thresholds. The one or more embodiments additionally and/or alternatively can provide a plug-and-play solution such as be initiating one or more predictions and generating an update where resource constraint is determined, such as via the thresholds.

The plug-and-play ability can be enabled by training the machine learning model, such as an AI model, that is employed by the one or more embodiments herein to predict the update to the service experiencing the resource-constrained communication. As indicated above, training can be based on any one or more of historical service provisions, recently provided graphical data and/or one or more generative adversarial networks (GANs). Training can be performed to provide a baseline service by the one or more embodiments described herein and at any additional frequency, such as after each iteration of use of the one or more embodiments.

Indeed, in view of the one or more embodiments described herein, a practical application of the systems, computer-implemented methods and/or computer program products described herein can be efficient continuation of a service being provided, absent a client noticing significant or any interruption. Employing machine learning and training, the systems, computer-implemented methods and/or computer program products described herein can provide such efficient service continuation for a variety of services based on initial training. Overall, such computerized tools can constitute a concrete and tangible technical improvement in the field of artificial intelligence forecasting and/or machine learning or active learning forecasting.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to code development, as compared to existing systems and/or techniques lacking such approach(es). Systems, computer-implemented methods and/or computer program products facilitating performance of these processes are of great utility in the field of active computer-based learning and cannot be equally practicably implemented in a sensible way outside of a computing environment.

One or more embodiments described herein can employ hardware and/or software to solve problems that are highly technical, that are not abstract, and/or that cannot be performed as a set of mental acts by a human. For example, a human, or even thousands of humans, cannot efficiently, accurately and/or effectively employ ML and/or AI to generate and/or predict service updates, as the one or more embodiments described herein can facilitate this process. And, neither can the human mind nor a human with pen and paper electronically effectively employ ML and/or AI to predict and generate service updates, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 8:
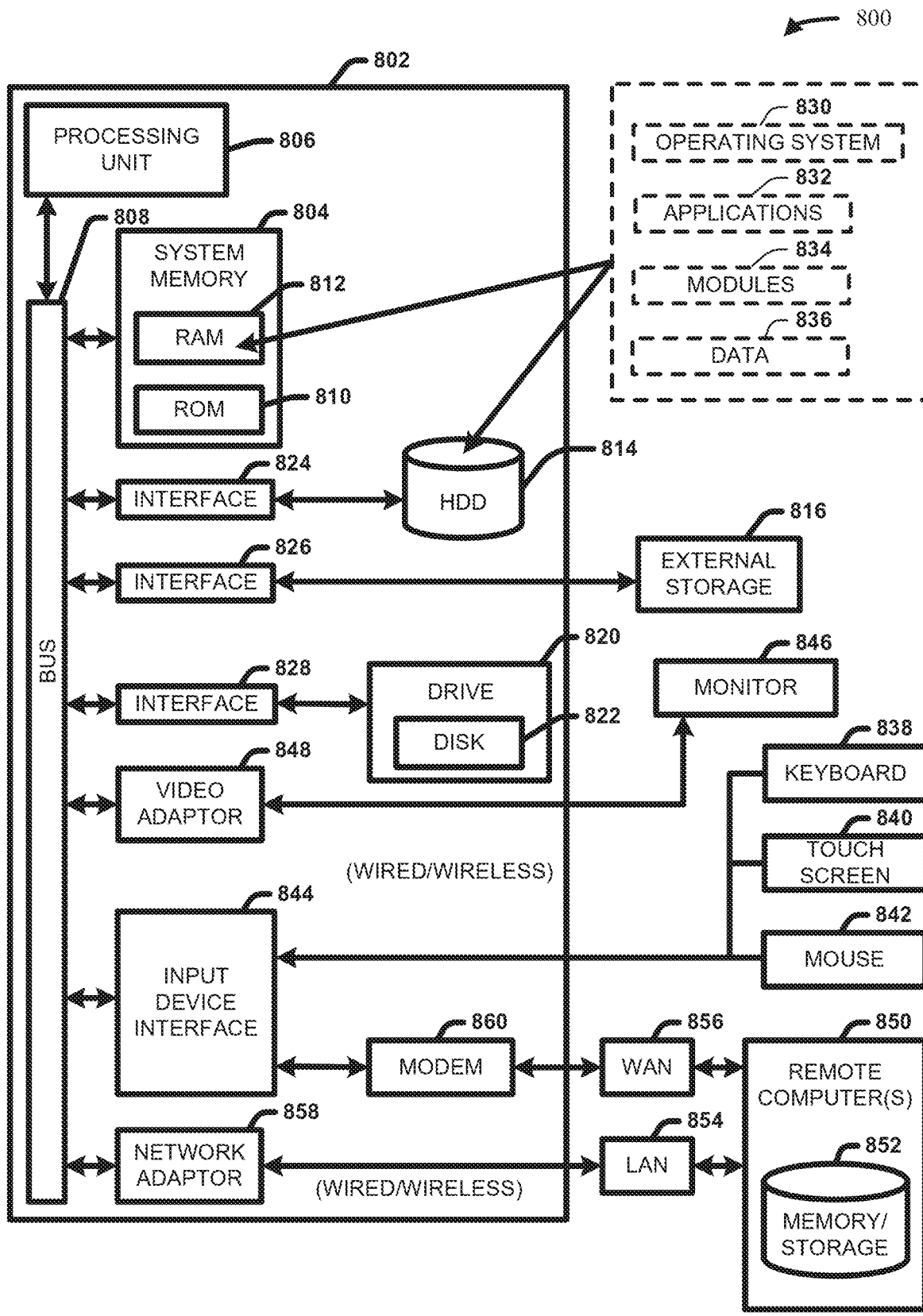
FIG. 8 illustrates a block diagram of an example, non-limiting, operating environment in which one or more embodiments described herein can be facilitated.
Figure 9:
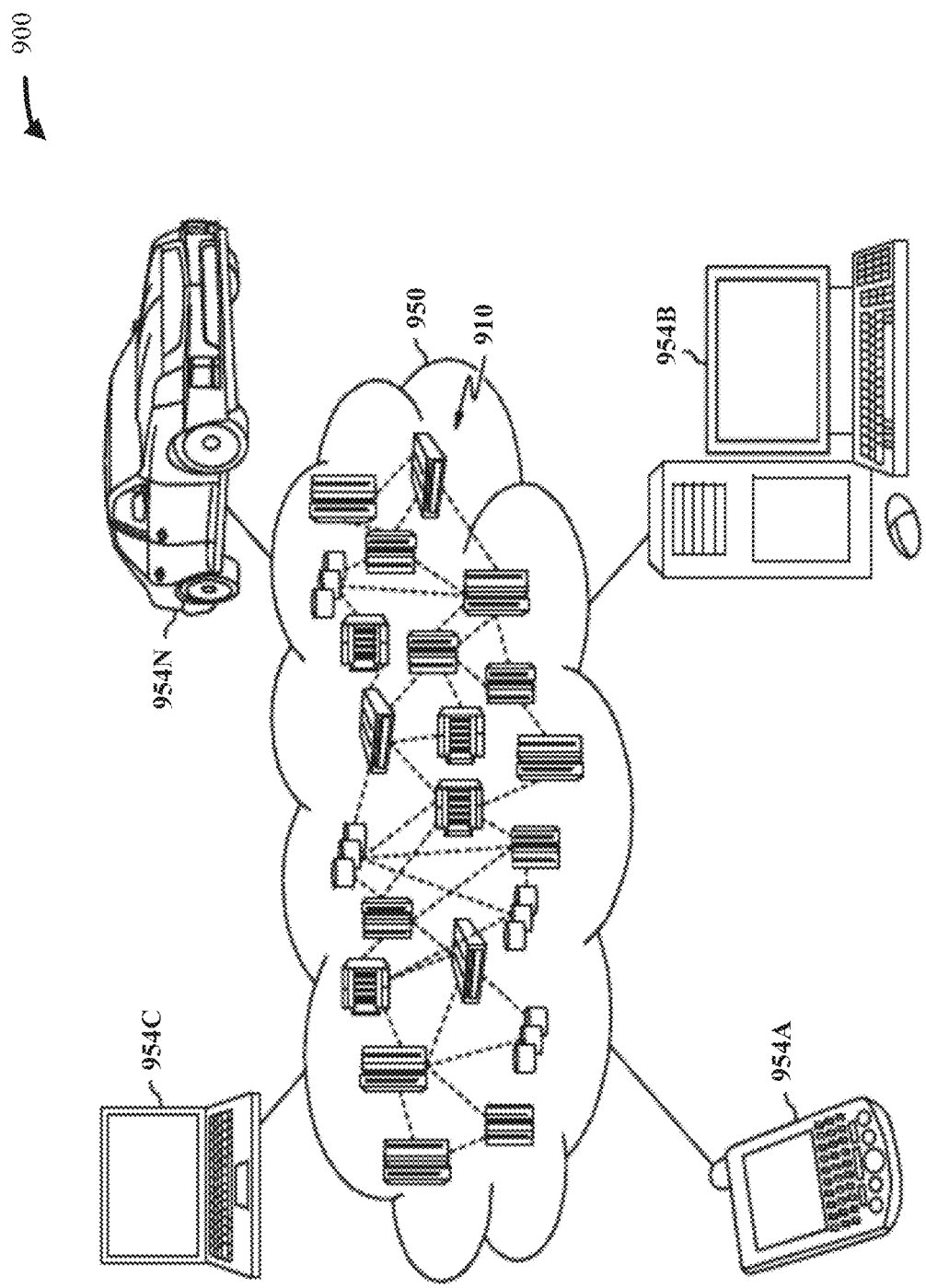
FIG. 9 illustrates a block diagram of an example, non-limiting, cloud computing environment in accordance with one or more embodiments described herein.
Figure 10:
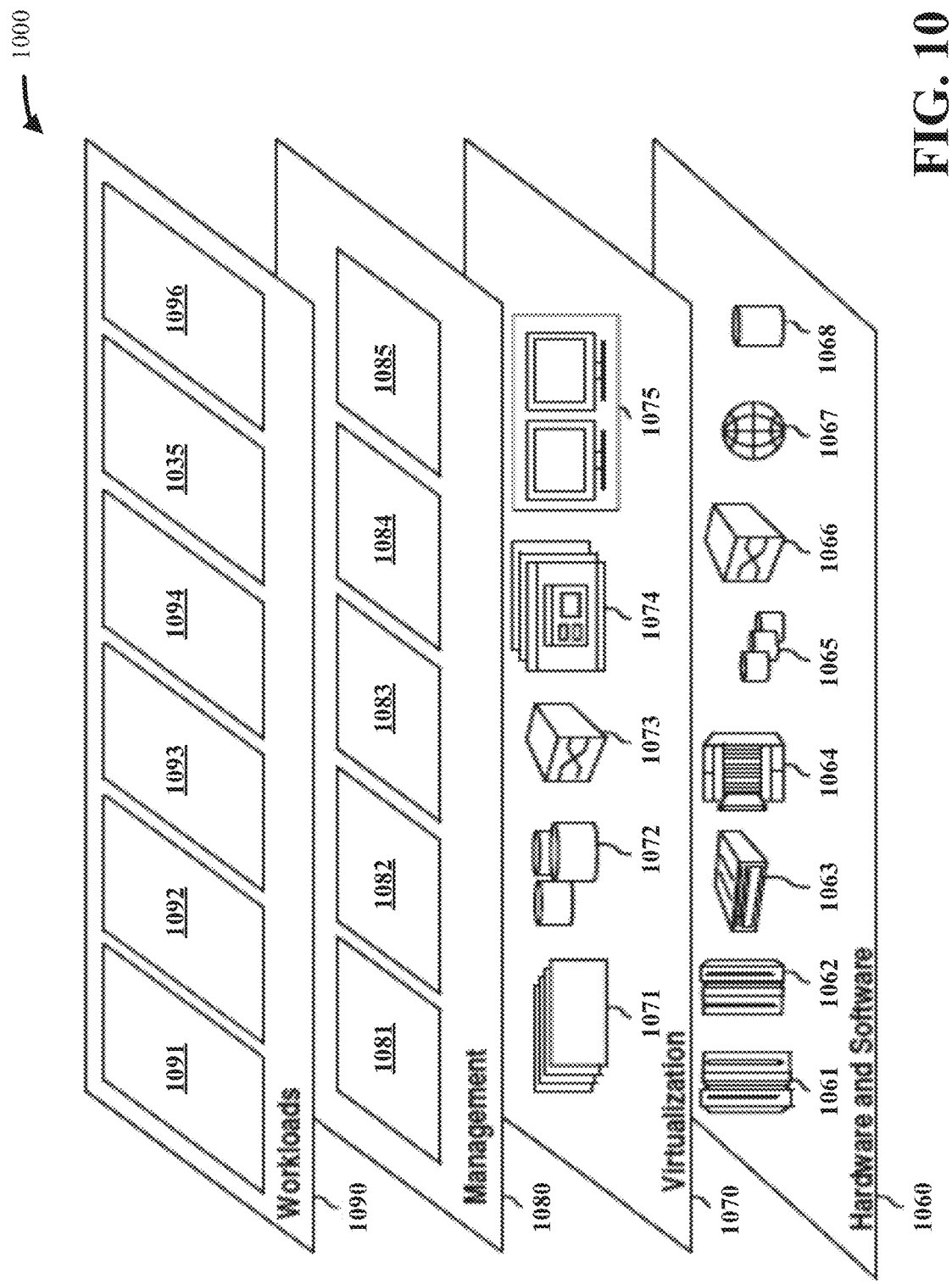
FIG. 10 illustrates a block diagram of example, non-limiting, abstraction model layers in accordance with one or more embodiments described herein.

Turning next to FIGS. 8-10, a detailed description is provided of additional context for the one or more embodiments described herein at FIGS. 1-7.

FIG. 8 and the following discussion are intended to provide a brief, general description of a suitable operating environment 800 in which one or more embodiments described herein at FIGS. 1-7 can be implemented. For example, one or more components and/or other aspects of embodiments described herein can be implemented in or be associated with, such as accessible via, the operating environment 800. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 8, the example operating environment 800 for implementing one or more embodiments of the aspects described herein can include a computer 802, the computer 802 including a processing unit 806, a system memory 804 and/or a system bus 808. One or more aspects of the processing unit 806 can be applied to processors such as 106 and/or 206 of the non-limiting systems 100 and/or 200. The processing unit 806 can be implemented in combination with and/or alternatively to processors such as 106 and/or 206.

Memory 804 can store one or more computer and/or machine readable, writable and/or executable components and/or instructions that, when executed by processing unit 806 (e.g., a classical processor, a quantum processor and/or like processor), can facilitate performance of operations defined by the executable component(s) and/or instruction (s). For example, memory 804 can store computer and/or machine readable, writable and/or executable components and/or instructions that, when executed by processing unit 806, can facilitate execution of the one or more functions described herein relating to non-limiting system 100 and/or non-limiting system 200, as described herein with or without reference to the one or more figures of the one or more embodiments.

Memory 804 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 806 can comprise one or more types of processors and/or electronic circuitry (e.g., a classical processor, a quantum processor and/or like processor) that can implement one or more computer and/or machine readable, writable and/or executable components and/or instructions that can be stored at memory 804. For example, processing unit 806 can perform one or more operations that can be specified by computer and/or machine readable, writable and/or executable components and/or instructions including, but not limited to, logic, control, input/output (I/O), arithmetic and/or the like. In one or more embodiments, processing unit 806 can be any of one or more commercially available processors. In one or more embodiments, processing unit 806 can comprise one or more central processing unit, multi-core processor, microprocessor, dual microprocessors, microcontroller, System on a Chip (SOC), array processor, vector processor, quantum processor and/or another type of processor. The examples of processing unit 806 can be employed to implement one or more embodiments described herein.

The system bus 808 can couple system components including, but not limited to, the system memory 804 to the processing unit 806. The system bus 808 can comprise one or more types of bus structure that can further interconnect to a memory bus (with or without a memory controller), a peripheral bus and/or a local bus using one or more of a variety of commercially available bus architectures. The system memory 804 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can include a high-speed RAM, such as static RAM for caching data.

The computer 802 can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Additionally, and/or alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) can be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and/or methods described herein can be implemented utilizing one or more commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that can allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

An entity can enter and/or transmit commands and/or information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 806 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally, and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments can be commonplace in offices and companies and can facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired and/or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal and/or external and a wired and/or wireless device, can be connected to the system bus 808 via the input device interface 844. In a networked environment, program modules depicted relative to the computer 802 or portions thereof can be stored in the remote memory/storage device 852. The network connections shown are merely exemplary and one or more other means of establishing a communications link among the computers can be used.

When used in either a LAN or WAN networking environment, the computer 802 can access cloud storage systems or other network-based storage systems in addition to, and/or in place of, external storage devices 816 as described above, such as but not limited to, a network virtual machine providing one or more aspects of storage and/or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, such as with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1950 described below with reference to FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatic s system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Referring now to details of one or more aspects illustrated at FIG. 10, a set 1000 of functional abstraction layers is shown, such as provided by cloud computing environment 950 (FIG. 19). One or more embodiments described herein can be associated with, such as accessible via, one or more functional abstraction layers described below with reference to FIG. 10 (e.g., hardware and software layer 1060, virtualization layer 1070, management layer 1080 and/or workloads layer 1090). It should be understood in advance that the components, layers and/or functions shown in FIG. 10 are intended to be illustrative only and embodiments described herein are not limited thereto. As depicted, the following layers and/or corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and/or networks and/or networking components 1066. In one or more embodiments, software components can include network application server software 1067, quantum platform routing software 1068; and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1083 can provide access to the cloud computing environment for consumers and system administrators. Service level management 1084 can provide cloud computing resource allocation and/or management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A client device, comprising:
a memory that stores computer executable components; and
a processor that executes at least one of the computer executable components that:
receives, via a network connection, a real full graphical representation of a current state of an interactive collaborative graphical environment from a server device;
presents, on a display associated with the client device, the real full graphical representation;
receives, via an input component associated with the client device, user input associated with the displayed real full graphical representation of the interactive collaborative graphical environment;
sends, via the network connection, the user input to the server device;
in response to identifying a degradation of the network connection that satisfies a defined criterion:
using a machine learning model, a locally inferred full graphical representation of an updated state of the interactive collaborative graphical environment based on the real full graphical representation and the user input;
presents, on the display, the locally inferred full graphical representation;
iteratively performs, until the degradation of the network connection no longer satisfies the defined criterion:
receives, via the input component, additional user input associated with the displayed locally inferred full graphical representation of the interactive collaborative graphical environment;
sends, via the network connection, the additional user input to the server device;
receives via the network connection, a real partial graphical representation of the updated state of the interactive collaborative graphical environment from the server device based on at least the additional user input;
predicts, using the machine learning model, an update to the displayed locally inferred full graphical representation based on the real partial graphical representation and the additional user input; and
presents, on the display, the locally inferred full graphical representation comprising the update.

2. The client device of claim 1, wherein the at least one of the computer executable components further:
in response to determining that the degradation of the network connection no longer satisfies the defined criterion:
sends, via the network connection, a request to the server device to provide an updated real full graphical representation of an updated current state of the interactive collaborative graphical environment.

3. The client device of claim 2, wherein the at least one of the computer executable components further:

receives, via the network connection, the updated real full graphical representation from the server device; and
determines a difference between the displayed locally inferred full graphical representation and the updated real full graphical representation.

4. The client device of claim 3, wherein the at least one of the computer executable components further:
updates, on the display, the displayed locally inferred full graphical representation based on the difference.

5. The client device of claim 3, wherein the at least one of the computer executable components further:
retrains, using the difference, the machine learning model to make predictions of locally inferred full graphical representations.

6. The client device of claim 1, wherein the degradation comprises an increase in latency of the network connection.

7. The client device of claim 1, wherein the degradation comprises a decrease in bandwidth of the network connection.

8. A computer-implemented method, comprising:
receiving, by a client device, via a network connection, a real full graphical representation of a current state of an interactive collaborative graphical environment from a server device;
presenting, by the client device, on a display associated with the client device, the real full graphical representation;
receiving, by the client device, via an input component associated with the client device, user input associated with the displayed real full graphical representation of the interactive collaborative graphical environment;
sending, by the client device, via the network connection, the user input to the server device;
in response to identifying a degradation of the network connection that satisfies a defined criterion:
predicting, by the client device, using a machine learning model, a locally inferred full graphical representation of an updated state of the interactive collaborative graphical environment based on the real full graphical representation and the user input;
iteratively performing, until the degradation of the network connection no longer satisfies the defined criterion:
receiving, by the client device, via the input component, additional user input associated with the displayed locally inferred full graphical representation of the interactive collaborative graphical environment;
sending, by the client device, via the network connection, the additional user input to the server device;
receiving, by the client device, a real partial graphical representation of the updated state of the interactive collaborative graphical environment from the server device based on at least the additional user input;
predicting, by the client device, using the machine learning model, an update to the displayed locally inferred full graphical representation based on the real partial graphical representation and the additional user input; and
presenting, by the client device, on the display, the locally inferred full graphical representation comprising the update.

9. The computer-implemented method of claim 8, further comprising:

in response to determining that the degradation of the network connection no longer satisfies the defined criterion:
  sending, by the client device, via the network connection, a request to the server device to provide an updated real full the graphical representation of an updated current state of the interactive collaborative graphical environment.

10. The computer-implemented method of claim 9, further comprising:
  receiving, by the client device, via the network connection, the updated real full graphical representation from the server device; and
  determining, by the client device, a difference between the displayed locally inferred full graphical representation the updated real full graphical representation.

11. The computer-implemented method of claim 10, further comprising:
  updating, by the client device, on the display, the displayed locally inferred full graphical representation based on the difference.

12. The computer-implemented method of claim 10, further comprising:
  retraining, by the client device, based on the difference, the machine learning model to make predictions of locally inferred full graphical representations.

13. The computer-implemented method of claim 8, wherein the degradation comprises an increase in latency of the network connection.

14. A computer program product facilitating a process to compensate a service being provided over a network connection, the computer program product comprising a non-transitory computer readable medium having program instructions embodied therewith, the program instructions executable by a processor of a client device to cause the processor to:
  receive, via a the network connection, a real full graphical representation of a current state of an interactive collaborative graphical environment from a server device and a client node;
  present, on a display associated with the client device, the real full graphical representation;
  receive, via an input component associated with the client device, user input associated with the displayed real full graphical representation of the interactive collaborative graphical environment;
  send, via the network connection, the user input to the server device;
  in response to identifying a degradation of the network connection that satisfies a defined criterion:
    predict, using a machine learning model, a locally inferred full graphical representation of an updated state of the interactive collaborative graphical environment based on the real full graphical representation and the user input;
    iteratively perform, until the degradation of the network connection no longer satisfies the defined criterion:
      receive, via the input component, additional user input associated with the displayed locally inferred full graphical representation of the interactive collaborative graphical environment;
      send, via the network connection, the additional user input to the server device;
      receive, by the client device, a real partial graphical representation of the updated state of the interactive collaborative graphical environment from the server device based on at least the additional user input;
      predicting, by the client device, using the machine learning model, an update to the displayed locally inferred full graphical representation based on the real partial graphical representation and the additional user input; and
      presenting, by the client device, on the display, the locally inferred full graphical representation comprising the update.

15. The computer program product of claim 14, wherein the program instructions are further executable by the processor to cause the processor to:
  in response to determining that the degradation of the network connection no longer satisfies the defined criterion:
    sending, by the client device, via the network connection, a request to the server device to provide an updated real full graphical representation.

16. The computer program product of claim 15 [6], wherein the program instructions are further executable by the processor to cause the processor to:
  receive, via the network connection, the updated real full graphical representation from the server device; and
  determine a difference between the displayed locally inferred full graphical representation and the updated real full graphical representation.

17. The computer program product of claim 16, wherein the program instructions are further executable by the processor to cause the processor to:
  retrain, based on the difference, the machine learning model to make predictions of locally inferred full graphical representations.

18. The computer program product of claim 16, wherein the program instructions are further executable by the processor to cause the processor to:
  update, on the display, the displayed locally inferred full graphical representation based on the difference.

19. The computer program product of claim 14, wherein the degradation comprises an increase in latency of the network connection.

20. The computer program product of claim 14, wherein the degradation comprises a decrease in bandwidth of the network connection.

* * * * *